(12) United States Patent
Li

(10) Patent No.: US 7,423,766 B1
(45) Date of Patent: Sep. 9, 2008

(54) INTERFEROMETRIC OPTICAL PROFILER

(76) Inventor: Chian Chiu Li, 1847 Bristol Bay CMN, San Jose, CA (US) 95131-3802

( * ) Notice: Subject to any disclaimer, the term of this patent is extended or adjusted under 35 U.S.C. 154(b) by 374 days.

(21) Appl. No.: 11/015,051

(22) Filed: Dec. 17, 2004

Related U.S. Application Data

(60) Provisional application No. 60/530,432, filed on Dec. 17, 2003.

(51) Int. Cl.
*G01B 9/02* (2006.01)

(52) U.S. Cl. ..................................... 356/521

(58) Field of Classification Search ................ 356/497, 356/511–514, 521
See application file for complete search history.

(56) References Cited

U.S. PATENT DOCUMENTS

| 4,639,139 | A | | 1/1987 | Wyant et al. | |
|---|---|---|---|---|---|
| 4,732,483 | A | | 3/1988 | Biegen | |
| 6,559,953 | B1 | * | 5/2003 | Davids | 356/521 |
| 6,819,435 | B2 | * | 11/2004 | Arieli et al. | 356/512 |
| 6,850,329 | B2 | * | 2/2005 | Tobiason et al. | 356/495 |
| 7,023,563 | B2 | * | 4/2006 | Li | 356/521 |
| 2002/0027661 | A1 | * | 3/2002 | Arieli et al. | 356/512 |
| 2002/0191894 | A1 | * | 12/2002 | Culver et al. | 385/16 |
| 2005/0030548 | A1 | * | 2/2005 | Li | 356/497 |

* cited by examiner

*Primary Examiner*—Michael A. Lyons
*Assistant Examiner*—Jonathan Skovholt

(57) ABSTRACT

An imaging-type interferometric optical profiler splits a beam reflected from a sample into two beam portions. One portion is a reference beam and the other a sample beam. The reference and sample beams are combined to create interference patterns which are used to obtain a surface profile of the sample. Since vibration of the sample causes the same optical path change, and no reference mirror is used, the interferometric optical profiler is relatively vibration-insensitive and has a fast measurement speed.

20 Claims, 4 Drawing Sheets

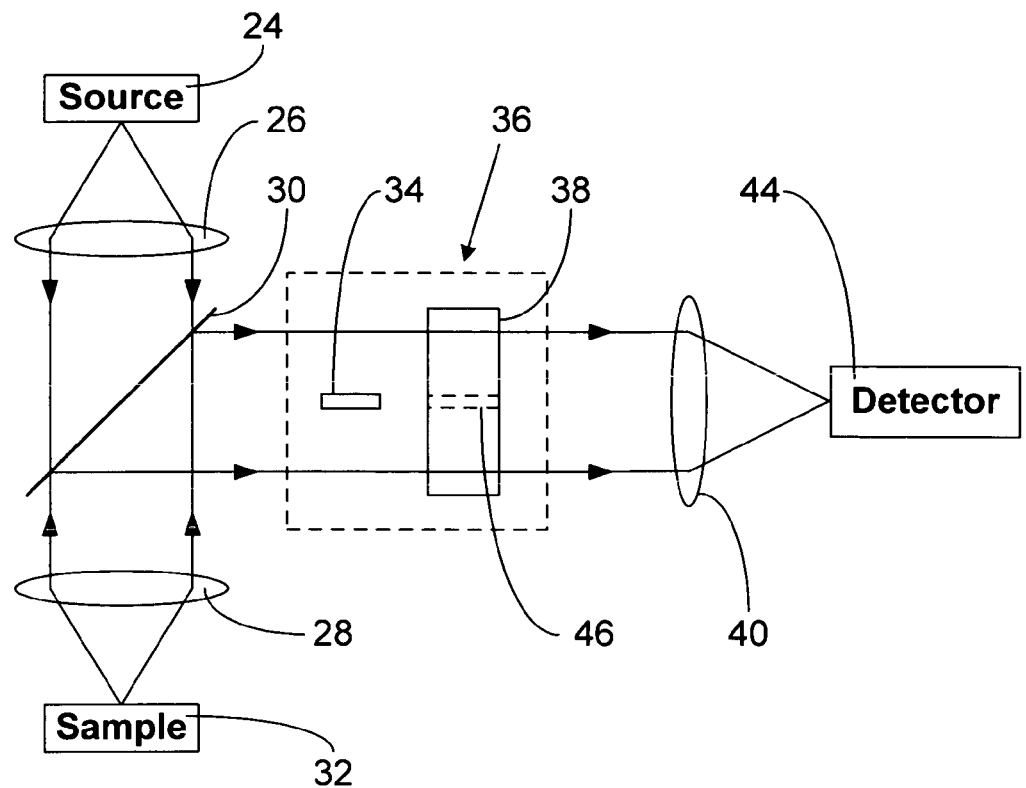
FIG. 1
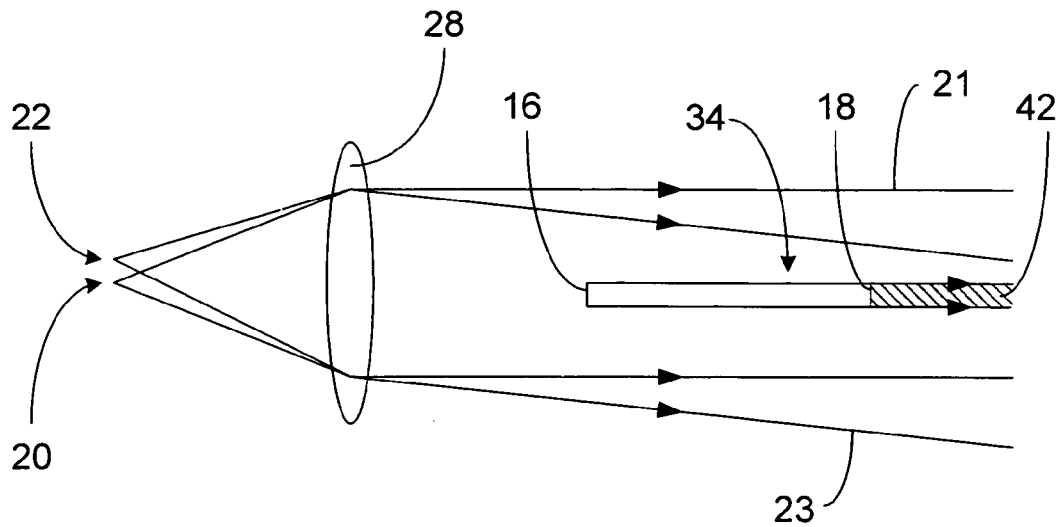
FIG. 2-A

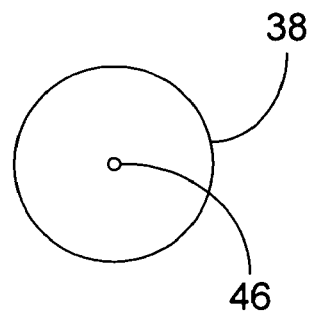
FIG. 2-B
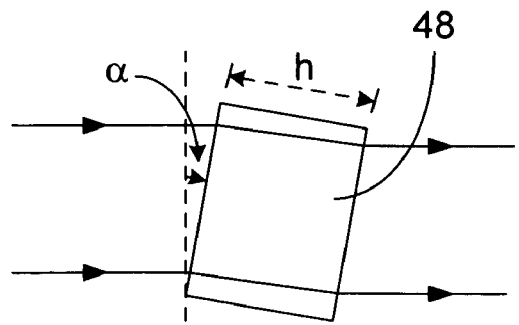
FIG. 2-C
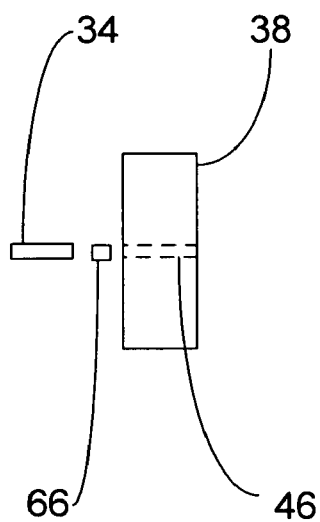
FIG. 3-A
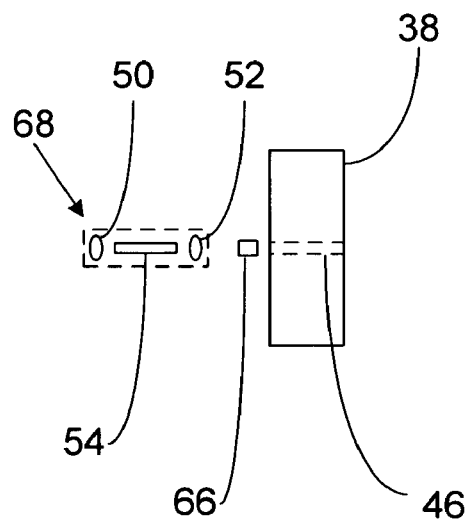
FIG. 3-B

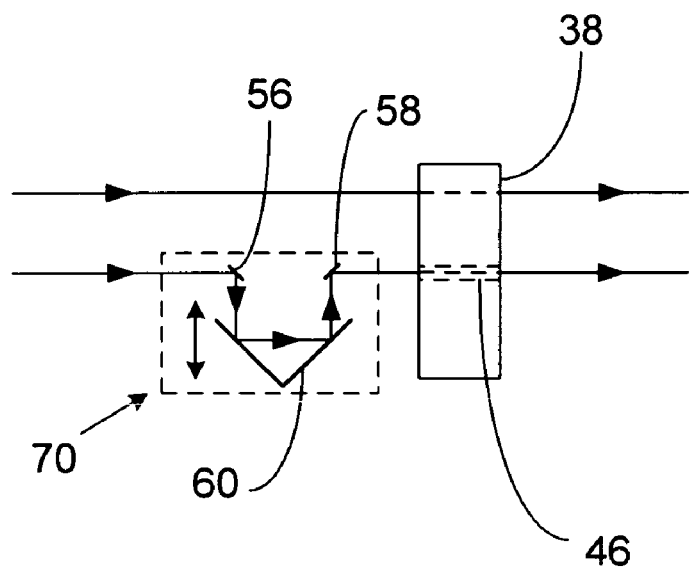
FIG. 3-C
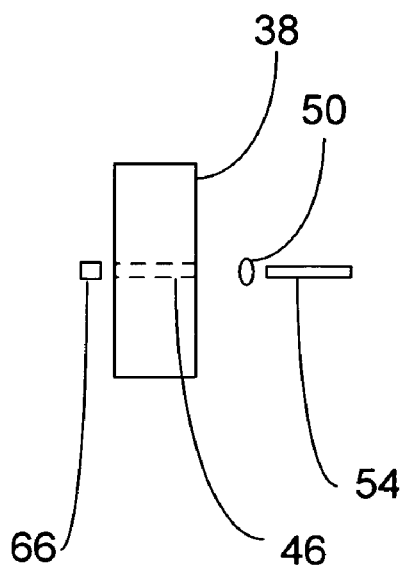
FIG. 4-A
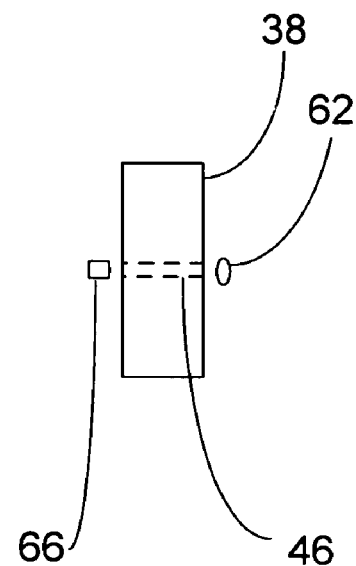
FIG. 4-B

INTERFEROMETRIC OPTICAL PROFILER

CROSS REFERENCE TO RELATED APPLICATION

This application is entitled to the benefit of Provisional Patent Application Ser. No. 60/530,432 filed 2003 Dec. 17.

FEDERALLY SPONSORED RESEARCH

Not applicable

SEQUENCE LISTING OR PROGRAM

Not applicable

BACKGROUND

1. Field of Invention

This invention is related to interferometric optical devices, particularly to interferometric optical profilers used in topography measurement.

2. Description of Prior Art

An interferometric optical profiler is a device which uses optical interference to measure the profile of a sample surface without physical contact. Surface profile measurement is often required in semiconductor, data storage, and fiberoptic telecommunication industries. For example, inspection of a silicon wafer's surface is often performed in the semiconductor industry. There are two major types of interferometric optical profilers: imaging and scanning types.

An imaging type profiler produces an optical image of a surface area. It is usually based on Michelson, Mirau, Linnik, or Fizeau interferometers, which use a beam splitter to split a beam from a light source into two beams by amplitude division. The two beams travel along separate paths and are reflected by a tunable reference mirror and a sample surface, which are in different places. The reflected beams are then recombined by the beam splitter and interfere with each other. The interference results in interference patterns, or intensity distribution on a detector.

The interference patterns depend upon two factors: optical path length difference between the two paths and the sample's surface profile. Thus the surface profile can be obtained by utilizing interference patterns and the corresponding tunable optical path length difference. The measurement is fast, but is sensitive to vibration since vibration of either the reference mirror or the sample changes the optical path. Because of vibration, such surface profilers are difficult to use in a production environment, for example, on a production line.

A scanning type profiler scans a surface to collect topography data. It is usually based on a concentric-beam interferometer or a common-path polarization interferometer. Although a scanning type profiler creates and makes use of two beams as well, the beams travel on either the same optical path, or on side-by-side paths. As a result, vibration effects are reduced. But due to its scanning nature, a scanning type profiler has a slow measurement speed which limits its applications.

Accordingly, current interferometric optical profilers are unable to make rapid measurements with good vibration insensitivity.

OBJECTS AND ADVANTAGES

Accordingly, several main objects and advantages of the present invention are:

a). to provide an improved imaging-type interferometric optical profiler;

b). to provide such a profiler which causes a portion of a beam to overlap another portion of the beam to generate an interference pattern;

c). to provide such a profiler which is relatively vibration insensitive.

d). to provide such a profiler which has a fast measurement speed and is relatively vibration insensitive.

Further objects and advantages will become apparent from a consideration of the drawings and ensuing description.

SUMMARY

In accordance with the present invention, an interferometric optical device is constructed as a fast-speed imaging-type surface profiler. The profiler employs a beam reflected from a sample and takes a beam portion as a reference beam and another portion as a sample beam. The reference and sample beams are combined to create interference patterns which are used to obtain a surface profile of the sample. Since vibration of the sample surface doesn't affect optical path length difference between the two beams, and no reference mirror is used, the profiler is relatively vibration-insensitive in addition to its fast-speed feature.

DRAWING FIGURES

FIG. 1 is a schematic diagram illustrating an embodiment of an interferometric optical profiler according to the invention.

FIG. 2-A is a schematic diagram illustrating a beam extraction method used in FIG. 1.

FIG. 2-B is a schematic diagram illustrating a plate used as a phase retarder in a cross-sectional view.

FIG. 2-C is a schematic diagram illustrating a method to tune the optical path length in FIG. 1.

FIGS. 3-A to 3-C are schematic diagrams illustrating additional embodiments of the spatial phase modulator according to the invention.

FIGS. 4-A and 4-B are schematic diagrams illustrating two embodiments of the spatial phase modulator having beam-expanding functions according to the invention.

Figure 5:
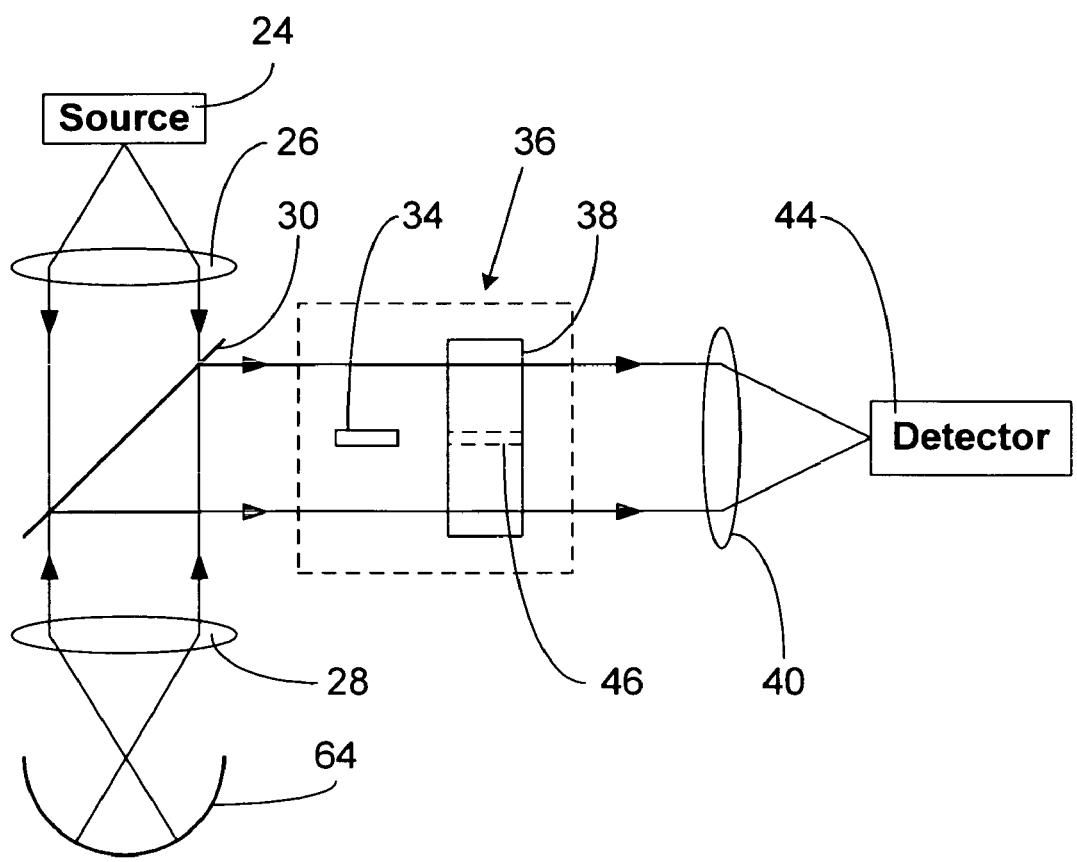
FIG. 5 is a schematic diagram illustrating an embodiment of interferometric optical profiler used in a concave surface measurement according to the invention.

| REFERENCE NUMERALS IN DRAWINGS | |
|---|---|
| 16 waveguide front end | 18 wave guide rear end |
| 20 point light source | 21 beam |
| 22 point light source | 23 beam |
| 24 light source | 26 lens system |
| 28 lens system | 30 beam splitter |
| 32 sample | 34 waveguide |
| 36 spatial phase modulator | 38 plate |
| 40 lens system | 42 beam |
| 44 detector | 46 waveguide |
| 48 plate | 50 lens system |
| 52 lens system | 54 waveguide |
| 56 reflector | 58 reflector |
| 60 retro reflector | 62 lens system |
| 64 concave surface | 66 plate |
| 68 waveguide system | 70 opto-mechanical system |

DETAILED DESCRIPTION

FIG. 1 & FIGS. 2-A to 2-C—Interferometric Optical Profiler

FIG. 1 illustrates schematically an embodiment of the interferometric optical profiler according to the invention. The components used here are individually well known in the field of optics and interferometry. A beam from a light source 24 is collimated by a lens system 26. Source 24 is preferably a single-mode light source, such as a point light source or a single-mode semiconductor laser diode. The collimated beam passes through a beam splitter 30 and is focused by a lens system 28 onto a surface area of a sample 32. The sample may be, e.g., a silicon wafer, a chip of an integrated circuit, or the tip of an optical fiber. The impinging light is then reflected by the surface. The reflected beam is collimated by lens system 28 and reflected by beam splitter 30. The beam splitter has two main types: polarization insensitive and polarization type. The former reflects part of a beam and transmits the other part regardless of the beam's polarization orientation. Each pass through the splitter, however, causes the beam a certain percentage of the power loss, since either the reflected or the transmitted beam part is wasted. The latter type transmits a beam having one polarization and reflects a beam having the other polarization which is perpendicular to the former one. The polarization type splitter has less optical power loss than the polarization insensitive type. When in use, extra optical components (not shown in FIG. 1), such as a half wave plate, are required. The purpose is to rotate the beam's polarization by 90 degree such that after the beam is transmitted through the splitter and reflected by the sample, it will be reflected by the same splitter. After that, the beam enters a spatial phase modulator 36 and is focused onto a detector 44 by a lens system 40. The embodiment is designed to image the sample's surface onto detector 44, which is preferably a detector array, such as an array of photodiodes.

Modulator 36 includes a waveguide 34 and a plate 38. It is employed to generate two beam portions from the reflected beam by wavefront division. Waveguide 34 has a beam-extraction function that is illustrated in FIG. 2-A.

In FIG. 2-A, waveguide 34 is disposed to process two beams 21 and 23, which are emitted from point light sources 20 and 22 and collimated by lens system 28. The angle between the two beams is dependent upon the distance between sources 20 and 22, and the characteristics of lens system 28. Waveguide 34 has a front end 16 and a rear end 18, and its waveguide direction is parallel to beam 21. Waveguide 34 is designed such that a beam 42, which emerges from end 18, is still collimated and dominated by beam 21. For example, waveguide 34 can be a transparent glass rod having a circular cross-section. The rod has two polished ends with anti-reflection (AR) coatings, and a coarse and scattering side surface. Assume that the rod has a diameter much larger than the beam's wavelength, and its diameter and length have such values that when beam 21 enters the rod, it comes out of end 18 as beam 42; while when beam 23 enters the rod, it is scattered by the rod's side surface before approaching end 18. Therefore, the rod, or waveguide 34, has a beam extraction function.

In other words, waveguide 34 can be used to extract light from point source 20. For an area light source, waveguide 34 functions as a filter to select light from a small part of the area source.

Referring back to FIG. 1, waveguide 34 splits the reflected beam into two portions, one of which is extracted from a particular area on the sample surface. The two portions then enter plate 38. Plate 38 works as a phase retarder to adjust optical path difference between the two portions, since tuning a beam's phase equals tuning its optical path length. The plate is made of transparent materials with AR coatings on its surfaces where the beam portions impinge. It has a waveguide 46 for transmitting the beam portion emerging from waveguide 34, as shown schematically in the cross-sectional view in FIG. 2-B. Waveguide 46 can be a cavity inside plate 38.

The two beam portions created by modulator 36 can be considered as a sample and a reference beam. The sample beam goes through plate 38 only and creates a sample image, which is an image of sample 32's surface area on detector 44. The reference beam passes through waveguide 34 and 46 and produces a reference image on the detector. The sample and reference beams have different optical path lengths determined by the surface profile of sample 32, waveguide 34, and plate 38. An interference pattern occurs where the two images overlap. The reference image comes from a small area of the sample surface, as explained in FIG. 2-A. If the reference beam is extracted such that it can be considered as coming from a point light source on the sample surface, it has a known wavefront. If it comes from an area which is relatively flat and small enough, it can still be assumed to have a known wavefront.

By tuning path difference of the two beams, the interference pattern changes accordingly. Since the reference beam's wavefront is known and the difference between the sample and reference paths is adjustable, the surface profile of the sample can be obtained by tuning the patterns.

One way to tune optical path is to make either waveguide 34, or plate 38, or both of them, tilt around an axis perpendicular to the direction of beam propagation. FIG. 2-C shows an example where a plate 48 is tilted by an angle $\alpha$. Assume the plate thickness is h and its refractive index is n. After the tilting, the optical path length change is $h(n-1)(1/\cos\alpha - 1)$.

Since vibration of the sample affects path difference of the sample and reference beams in the same manner, and no reference mirror is employed, the interference pattern is relatively not sensitive to vibration, so is the profile measurement.

Since the wavelength of the light source isn't limited by the profiler structure, the embodiment can use any optical wavelength.

FIGS. 3-A to 3-C—Spatial Phase Modulators

FIGS. 3-A to 3-C illustrate schematically various embodiments of the spatial phase modulator which creates a sample and reference beam and tunes an optical path length difference between the two beams. The modulator embodiments can replace modulator 36 in FIG. 1 separately. As shown in FIG. 3-A, a small plate 66 is inserted between waveguide 34 and plate 38. Plate 66 can be tilted to change the optical path for a reference beam coming out of waveguide 34. Compared to modulator 36 of FIG. 1, waveguide 34 in FIG. 3-A is in a fixed position. Since tilting waveguide 34 causes optical power loss, this embodiment improves measurement sensitivity.

Plate 66 can also be made of electrooptic or thermooptic materials and achieves the same result by changing its refractive index. For example, materials such as liquid crystal, $LiNbO_3$, and semiconductors can be employed to tune a path length without moving parts.

In FIG. 3-B, waveguide 34 of FIG. 3-A is replaced by a mode-mixing system 68. System 68 comprises lens systems 50 and 52, and a waveguide 54. Waveguide 54 is preferably of single mode. Lens system 50 couples the beam into waveguide 54. Lens system 52 collimates the beam coming out of the waveguide. System 68 has a similar beam extraction function to that of waveguide 34 in FIG. 2-A, since only certain beam can be coupled into it. System 68 functions better than waveguide 34 in terms of wavefront uniformity when waveguide 54 is of the single-mode type. In the single-mode waveguide, all modes or phase components of the waves traveling inside are mixed and their wavefront is converted to a certain pattern defined by the waveguide. When the reference beam comes out of the waveguide, it has a more uniform wavefront shape. Thus, profile measurement is improved.

In FIG. 3-C, the modulator uses an opto-mechanical system 70 to obtain the needed optical path change. System 70 contains reflectors 56 and 58, and an adjustable retro reflector 60. It selects certain beams, and changes the optical path length by moving reflector 60. Waveguide system 68 (not shown in FIG. 3) can be added either in front of system 70 or between 70 and plate 38.

FIGS. 4-A and 4-B—Additional Spatial Phase Modulators

FIGS. 4-A to 4-b illustrate schematically two more embodiments of the spatial phase modulator that can replace modulator 36 in FIG. 1. Modulators in these two embodiments have beam-expanding functions. As discussed in connection with FIG. 1, a surface profile is obtained by tuning interference patterns. The pattern results from overlap of sample and reference images. However, the reference image occupies a limited area on detector 44 because of the thin reference beam. Thus the usable area of a sample image is limited. To overcome this weakness, the embodiment of FIG. 4-A uses a scheme that enlarges the reference image. Again, plate 66 is responsible for optical path change. After a reference beam is transmitted through plates 66 and 38, it is coupled into waveguide 54 by lens system 50. When the beam comes out of waveguide 54 or the modulator, it becomes divergent since there is no focusing lens system, which is different from the modulators in FIG. 1 and FIGS. 3-A to 3-C. Referring back to FIG. 1, if a beam's emitting point is on the focal plane of lens system 40 which is not a collimating lens system, the beam becomes more convergent. Thus when the rear end of waveguide 54 is placed on the focal plane of lens system 40, the reference beam is enlarged. Therefore the reference image and the usable area of the sample image are greatly expanded.

A simpler version of the system of FIG. 4-A is shown in FIG. 4-B, where a lens system 62 converts a reference beam into a divergent one to provide a larger reference image.

Figure 6:
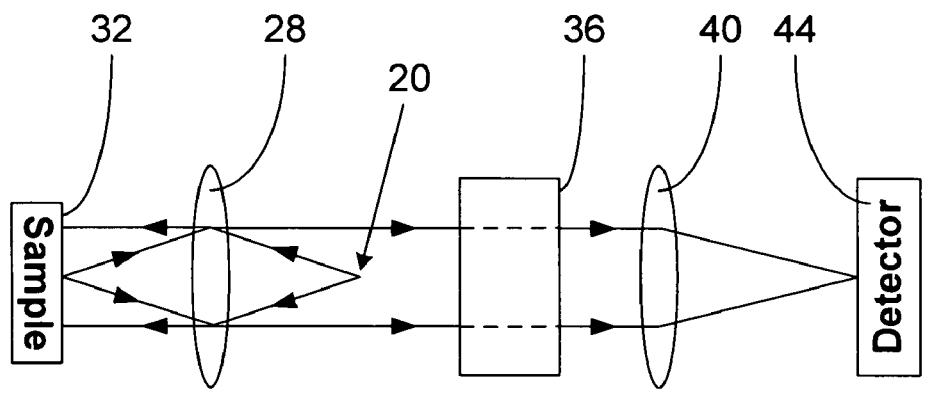
FIG. 6 is a schematic diagram illustrating an embodiment of interferometric optical profiler having a compact structure according to the invention.

FIGS. 5 and 6—Additional Interferometric Optical Profilers

In FIG. 1, the beam is focused onto the sample. Each time, only a small area within the focus spot is measured, which doesn't fit applications where a large concave surface under test requires an interference pattern covering the whole surface. For such requirement, the embodiment of FIG. 5 shows a solution where a concave surface 64 is placed out of the focal plane of lens system 28. Assume that surface 64 is spherical. When its focal point coincides with that of lens system 28, the reflected beam has a uniform wavefront. Any unevenness on the surface will affect the wavefront and cause a change of the interference pattern. Thus the concave surface can be measured.

The embodiment of FIG. 6 is a simplified and compact version of that in FIG. 1. Point light source 20 emits a beam from system 28's focal plane. The beam is collimated and impinges onto the surface of sample 32, which is on the other focal plane of system 28. The beam is then reflected by the surface, collimated by system 28, and focused onto detector 44 after passing through spatial phase modulator 36 in a similar way to that of FIG. 2-A.

CONCLUSION, RAMIFICATIONS, AND SCOPE

Accordingly, the reader will see that according to the invention I have provided an improved interferometric optical profiler in which two beam portions from a sample surface serve as sample and reference beams. The two beams generate interference patterns that can be used to obtain the surface profile of the sample. The measurement is relatively vibration-insensitive and has a fast measurement speed.

Although the description above contains many specificities, these should not be construed as limiting the scope of the invention but as merely providing illustrations of some of the presently preferred embodiments. Numerous modifications, alternations, and variations will be obvious to those skilled in the art.

For example, the point light source used in above embodiments can be a light generating spot like a light-emitting end of single-mode fiber. The light source can be coherent or have low coherence. A coherent light source has a long coherent length and must be carefully considered in determining the optical path difference, since a phase difference of $2n\pi$, where n is an integer, yields the same result as of zero phase difference.

The tuning schemes used in all spatial phase modulators, e.g., tilting a plate, changing the refractive index of electro-optic or thermo-optic materials, and other mechanical methods, are interchangeable and can be combined as well.

In FIGS. 3-A to 3-C, the sequence of waveguide, plates, and systems is interchangeable.

A waveguide system can be added to any embodiment to improve wavefront uniformity of a reference beam.

To enlarge a reference image by the beam-expanding method, the origin of the divergent beam can be placed either on a focal plane of a lens system, or out of the focal plane. When it is on the focal plane, care must be taken in cases where the reference beam impinges onto the detector at an angle other than normal, since an angled beam introduces path differences of its own. When the origin is out of the focal plane, the beam is either convergent or divergent, which demands more considerations to obtain surface profiles from interference patterns.

For a spatial phase modulator as shown in the schematic figures, its waveguide 34, waveguide system 68, plate 66, waveguide 54, or lens system 62, can be placed in the position of waveguide 46 inside plate 38, assuming their functions are preserved.

A spatial phase modulator can function without plate 38 as well. As a result, the patterns on detector 44 are determined by the interference of unequal optical paths. If the optical path length difference is large, a coherent light source having a enough coherent length is required so that interference can occur. Here caution must be taken when calculating the surface profile from the patterns.

In FIG. 6, interference patterns can also be created without system 40, assume that lens system 28 generates a sample surface image. For spatial phase modulator 36, the discussed beam-expanding scheme is optional. Again, contributions from beam tilting and whether the beam is divergent or convergent have to be considered. The same ramification can also apply to other embodiments.

Lastly, although above discussions are related to applications of surface profile measurement, the embodiments are for wavefront measurement in a more general term. In fact, what is measured is the distribution of amplitude and phase of a wavefront influenced by a surface.

Therefore the scope of the invention should be determined by the appended claims and their legal equivalents, rather than by the examples given.

The invention claimed is:

1. A system for performing an interferometric optical measurement on a sample comprising:
   (a) a light source for generating a first beam, said sample being disposed to interact with at least part of said first beam to provide a second beam, said second beam including a plurality of beam portions, said beam portions overlapping at least partially;
   (b) a spatial phase modulator for selecting by selecting means including using wavefront division at least one of said beam portions, said spatial phase modulator being arranged to produce phase shift on at least one of said beam portions, said selecting means being arranged to exclude at least one of said beam portions at least partially;
   (c) combining means for combining said beam portions for generating interference; and
   (d) a detector for sensing said interference.

2. The system according to claim 1, further including mode-mixing means for mixing modes of at least one of said beam portions.

3. The system according to claim 2 wherein said mode-mixing means includes a waveguide system.

4. The system according to claim 1 wherein said detector includes a detector array for sensing intensity distribution of said interference.

5. The system according to claim 1 wherein said spatial phase modulator is arranged to select at least one of said beam portions using waveguide means.

6. The system according to claim 1 wherein said spatial phase modulator is arranged to produce a tunable phase shift on at least one of said beam portions.

7. The system according to claim 1, further including beam-expanding means for expanding the beam size of at least one of said beam portions, whereby the area of said interference is enlarged by the expanded beam portion.

8. The system according to claim 1 wherein said light source is a point light source.

9. The system according to claim 1, further including focusing optics for focusing said first beam onto said sample.

10. A system for performing an interferometric optical measurement on an object comprising:
    1) source means for arranging a first beam, at least part of said first beam being arranged to interact with said object for providing a second beam;
    2) modulator means for splitting said second beam into a plurality of beam portions and producing phase shift on at least one of said beam portions;
    3) mode-mixing means for mixing the modes of at least one of said beam portions;
    4) combining means for combining said beam portions for generating interference; and
    5) a detector for sensing said interference.

11. The system according to claim 10 wherein said detector includes a detector array for sensing intensity distribution of said interference.

12. The system according to claim 10 wherein said mode-mixing means includes a waveguide subsystem.

13. The system according to claim 10, further including beam-expanding means for expanding the beam size of at least one of said beam portions, whereby the area of said interference is enlarged by the expanded beam portion.

14. The system according to claim 10, further including phase tuning means for adjusting the phase of at least one of said beam portions.

15. A method for an optical interferometric measurement comprising:
    (a) providing optical radiation carrying information to be obtained, said radiation comprising a plurality of beam portions, each of said beam portions overlapping at least another of said beam portions at least partially;
    (b) selecting at least one of said beam portions, said selecting step including using wavefront division, said selecting step being arranged to exclude at least one of said beam portions at least partially;
    (c) phase shifting at least one of said beam portions;
    (d) combining said beam portions for generating an interferometric output; and
    (e) detecting said interferometric output by a detector, whereby said interferometric output is used in applications including surface profile determination.

16. The method according to claim 15 wherein said detecting step includes sensing intensity distribution of said interferometric output.

17. The method according to claim 15, further including mixing modes of at least one of said beam portions.

18. The method according to claim 15, further including increasing the beam size of at least one of said beam portions, whereby the area of said interferometric output is enlarged by the increased portion size.

19. The method according to claim 15 wherein said selecting step includes extracting at least one of said beam portions by using a waveguide device.

20. The method according to claim 15, further including phase tuning at least one of said beam portions for generating different interferometric output.

* * * * *